Jan. 11, 1927.
R. J. LENERVILLE
COFFEE PERCOLATOR
Filed Feb. 8, 1926
1,613,801
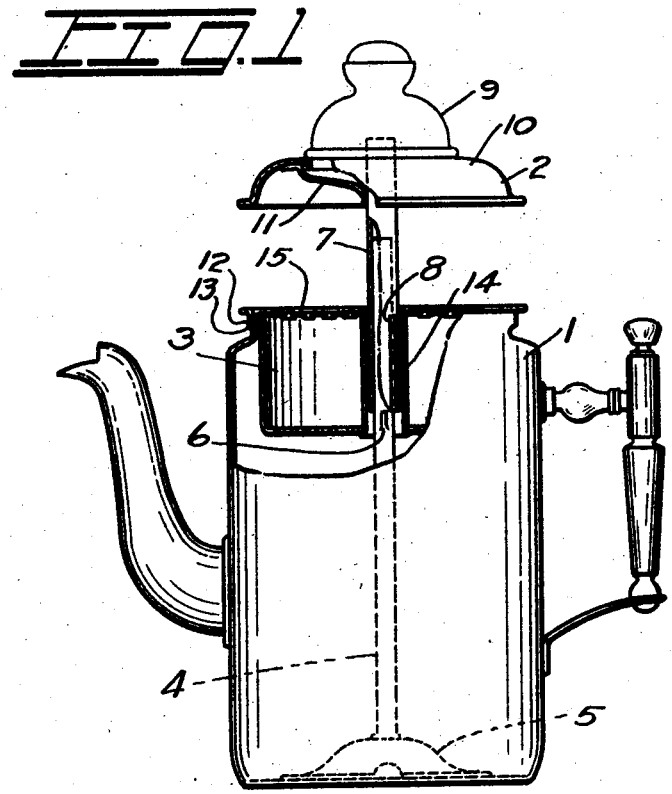
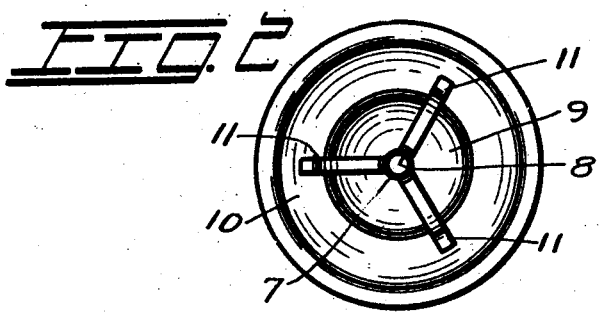
Inventor
Robert J. Lenerville
By Harry Bowen
Attorney Patented Jan. 11, 1927.

1,613,801

UNITED STATES PATENT OFFICE.

ROBERT J. LENERVILLE, OF TACOMA, WASHINGTON.

COFFEE PERCOLATOR.

Application filed February 8, 1926. Serial No. 86,784.

The invention is an improvement in coffee percolators by which the cover may be raised to a position above the percolator or lowered so that it will rest upon the top of the percolator, and in which the perforated container is provided with a perforated cover.

The object of the invention is to provide a coffee percolator which is so constructed that it may be used in the ordinary manner or with the cover raised to a predetermined position.

Another object of the invention is to provide a means for readily holding the cover of a coffee percolator above the body of the percolator which will readily permit its being lowered to the top of the body.

And a still further object of the invention is to provide an adjustable cover for coffee percolators which is of a simple and economical construction.

With these ends in view the invention embodies a coffee percolator having a vertical tube in the center which extends upward a slight distance above the top of the percolator, a lug on the said tube, another tube having a slot in one side and slidable over the said former tube, a cover attached to the said latter tube, a perforated container in the top of the said percolator, and a perforated cover for the said container.

Other features and advantages of the invention will appear from the following description taken in connection with the drawings, wherein:—

Figure 1 is a side elevation of a percolator with part broken away.

Figure 2 is a view looking toward the under side of the cover.

In the drawings the device is shown as it would be made wherein numeral 1 indicates the body of the percolator, numeral 2 the cover, and numeral 3 the perforated container.

The body of the container may be made as shown in the drawing or of any suitable design, and in the center of the body is a tube 4, having a base 5. A lug 6 is attached to one side of the tube, and it will be observed that normally the lower end of another tube 7 that is slidable over the tube 4 will rest upon the lug 6. It will also be observed that the tube 7 is provided with a slot 8 into which the lug 6 will fit so that as the cover 2 is turned to such a position that the slot 8 will be in line with the lug 6 it will slide down over the lug and permit the cover to rest upon the top of the percolator.

The cover 2 may be provided with a glass portion 9 and a lower rim 10, and the lower rim 10 is held to the tube 7 by arms 11, as shown.

The perforated container 3 is made as shown and is provided with a rim 12 by which it may be held in a recess 13 adjacent to the upper end of the percolator, and at the center of the container 3 is a tube 14 which is large enough to permit the tube 7 to pass therethrough. On top of the container 3 is a perforated cover plate 15 that may readily be removed.

It will be understood that changes may be made in the construction without departing from the spirit of the invention. One of which changes may be in the design of the percolator or cover, another may be in the design or arrangement of the perforated container 3, and still another may be in the use of other means for adjustably holding the cover in the upper position.

The construction will be readily understood from the foregoing description. To use the device the percolator may be filled with water and coffee in the usual manner and when it has started to percolate the cover may be readily raised to the position shown, and it will be observed that as it is slightly turned the lower end of the tube 7 will rest upon the lug 6 and hold it in the upper position. It will be observed that in this position the coffee will rise through the tubes and drop upon the perforated plate 15 and pass through it and through the container 3 back to the lower portion of the percolator. This will give the coffee an opportunity to pass through an air space as it is percolating and it has been found that while passing through this air space all impurities are removed.

It is also understood that although the design shown and described is for a percolator that may be placed upon a stove or hot-plate the adjustable cover may be used on percolators that are provided with electric heating elements.

Having thus fully described the invention, what I claim as new and desire to secure by Letters Patent, is:—

1. In a percolator for coffee or the like, a body portion, a vertical tube in the center of the said body portion, a lug on the said vertical tube, another tube slidable on the said former tube, said latter tube having a cover for the said percolator attached thereto, and a slot in the lower end to fit over the lug on the said vertical tube, a perforated container removably held in the upper end of the said body portion, and a perforated cover for the said container.

2. In a device of the class described, a container, a cover, a tube in the said container having a lug thereon, and a tube on the said cover slidable over the tube on the said container and having a slot therein.

In testimony whereof he affixes his signature.

ROBERT J. LENERVILLE.